US 8,126,518 B2

(12) United States Patent
Levien et al.

(10) Patent No.: US 8,126,518 B2
(45) Date of Patent: *Feb. 28, 2012

(54) TRANSFER THEN SLEEP

(75) Inventors: Royce A. Levien, Lexington, MA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 457 days.

This patent is subject to a terminal disclaimer.

(21) Appl. No.: 12/313,276

(22) Filed: Nov. 18, 2008

(65) Prior Publication Data

US 2009/0141663 A1    Jun. 4, 2009

Related U.S. Application Data

(63) Continuation-in-part of application No. 10/995,889, filed on Nov. 22, 2004, now Pat. No. 7,424,288, and a continuation of application No. 11/050,401, filed on Feb. 2, 2005, now Pat. No. 7,496,358.

(51) Int. Cl.
*H04W 4/16* (2009.01)
*H04W 52/02* (2009.01)
*H04M 3/58* (2006.01)

(52) U.S. Cl. ............... 455/574; 455/343.1; 455/415; 455/456.1

(58) Field of Classification Search .............. None
See application file for complete search history.

(56) References Cited

U.S. PATENT DOCUMENTS

| 7,424,288 | B2 | 9/2008 | Allen et al. |
| 7,424,289 | B2 | 9/2008 | Levien et al. |
| 7,466,977 | B2 | 12/2008 | Levien et al. |
| 2002/0085516 | A1 | 7/2002 | Bridgelall |
| 2003/0003900 | A1 | 1/2003 | Goss et al. |
| 2003/0037110 | A1 | 2/2003 | Yamamoto |
| 2003/0073431 | A1 | 4/2003 | Dorenbosch |

FOREIGN PATENT DOCUMENTS

| EP | 1 330 075 A1 | 7/2003 |
| EP | 1 370 056 A1 | 12/2003 |
| JP | 2005/252511 | 9/2005 |
| WO | WO01/43459 | 6/2001 |
| WO | WO 01/43459 A2 | 6/2001 |
| WO | WO2006/058036 | 6/2006 |

OTHER PUBLICATIONS

PCT International Search Report; International App. No. PCT/US05/42383; May 22, 2006; pp. 1-3.
EPO Supplementary European Search Report; App. No. EP 05852036; Jul. 1, 2011; pp. 1-7.
Topolsky, Joshua; "Trillian gets there first, brings Continuous Client features to latest build"; bearing a date of Mar. 1, 2011; pp. 1-8; located at: http://www.engadget.com/2011/03/01/trillian-gets-there-first-brings-continuous-client-features-to/ ; Printed on Mar. 3, 2011.

*Primary Examiner* — Philip Sobutka

(57) ABSTRACT

A second communication device is detected in proximity to a first communication device engaged in a call. A substantially uninterrupted transfer of the call is provided from the first communication device to the second communication device. At least a part of the first communication device is placed into a sleep mode in response to transfer of the call to the second communication device.

37 Claims, 6 Drawing Sheets

TRANSFER THEN SLEEP

CROSS-REFERENCE TO RELATED APPLICATIONS

The present application is related to and claims the benefit of earliest available effective filing date(s) from the following listed application(s) (the "Related Applications") (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

1. For purposes of the USPTO extra-statutory requirements, the present application constitutes a continuation of U.S. Patent Application entitled TRANSFER THEN SLEEP, naming Royce A. Levien; Mark A. Malamud; and John D. Rinaldo, Jr. as inventors, filed 2 Feb. 2005, application Ser. No. 11/050,401, now U.S. Pat. No. 7,496,358 which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

PRIORITY

This is a continuation-in-part of U.S. patent application Ser. No. 10/995,889 filed on Nov. 22, 2004 now U.S. Pat. No. 7,424,288.

TECHNICAL FIELD

The present disclosure relates to transfer of communication among devices.

BACKGROUND

Mobile communication devices are now a common feature in both personal and commercial environments. Such devices continue to improve in both functionality and reliability. However, being adapted for mobility brings drawbacks. Such devices tend to have small, limited keyboards and small screens, among other limitations.

The users of mobile devices are often in proximity with other communication devices. These other devices may, due to their larger size, have advantages not readily available in more portable devices. For example, these other devices may have superior audio, video, or imaging capabilities relative to their mobile counterparts. For these and other reasons, it may be advantageous to employ the capabilities of proximate devices when communicating via mobile devices.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A second communication device is detected in proximity to a first communication device engaged in a call. A substantially uninterrupted transfer of the call is provided from the first communication device to the second communication device. At least a part of the first communication device is placed into a sleep mode in response to transfer of the call to the second communication device.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
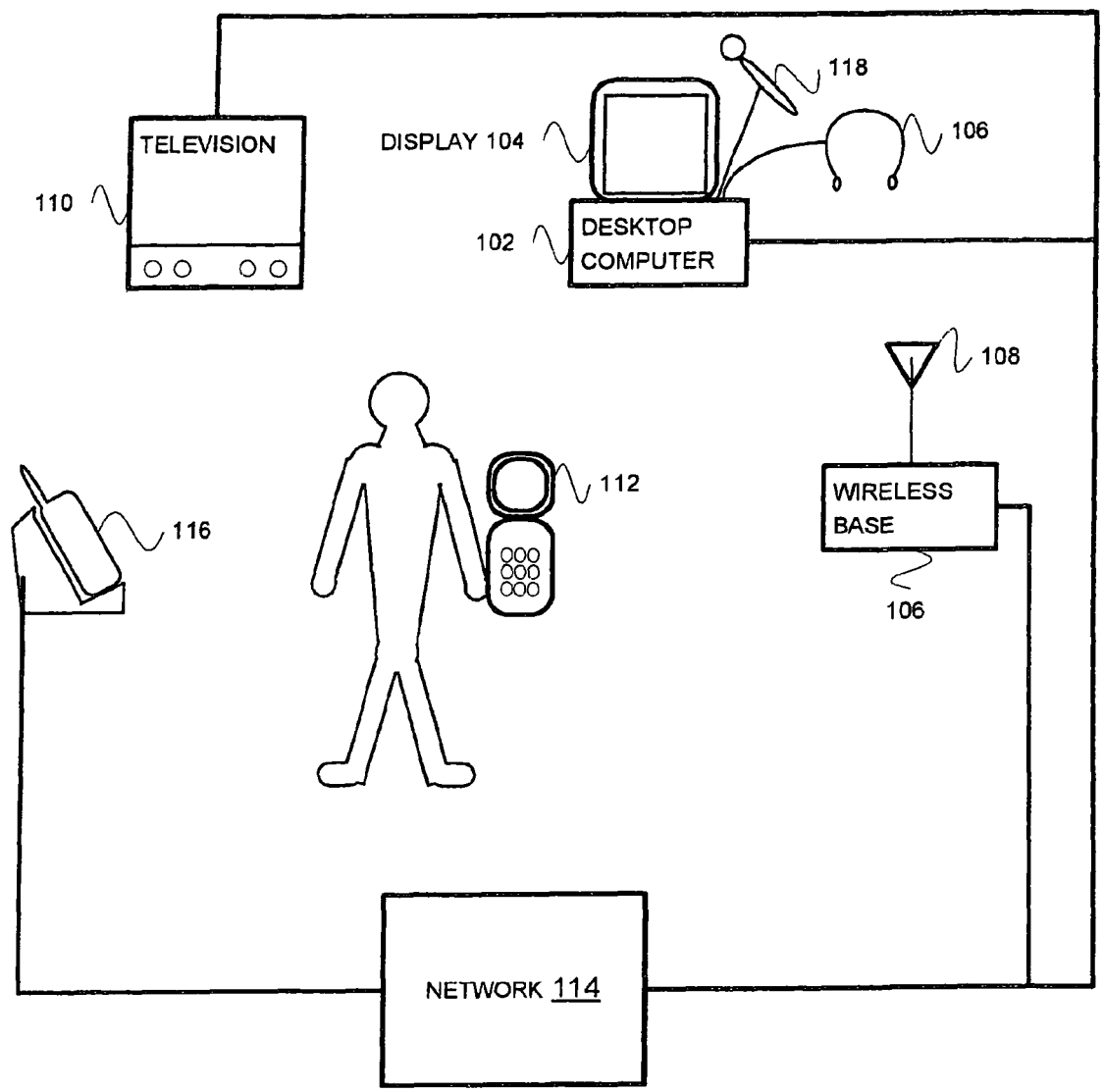
FIG. 1 is a block diagram of an embodiment of a communication environment.

FIG. 1 is a block diagram of a communication environment. The wireless communication device 112 provides wireless communication of signals to and from other devices. Examples of a wireless communication device include a cellular telephone 112, a wireless telephone handset 116, a personal digital assistant, and/or a laptop computer. The wireless communication device 112 may transmit and receive analog and/or digital signals representing human voices. The wireless communication device 112 may also transmit and receive various forms of non-voice data.

The wireless communication device 112 exchanges signals with the network 114, either directly or via one or more antennas 108 of a co-located wireless base station 106.

The exchange of signals between the wireless device 112 and the network 114 may result in the establishment of a call, whereby the device user may obtain and/or provide voice and/or non-voice information with another person and/or with a computing device. For example, two individuals may engage in a conversation using their cellular telephones, such as device 112. Or, a user of device 112 may interact with a computing device to obtain his electronic mail.

The communication environment may comprise a desktop computer 102, which in turn may comprise a display 104 and/or speakers 106. Alternatively or additionally, some environments may include, for example, a laptop computer or a terminal interface to a central shared computing resource.

The display 104 provides for the display of visual information such as text, images, windows, menus, icons, and video. In some embodiments, the display 104 comprises cathode ray tube technology. In other embodiments, the display 104 comprises flat screen technology.

The speakers 106 provide rendering (e.g., playing) of audio information. In some embodiments, the speakers 106 comprise headphones. In other embodiments stand-alone and/or built-in speakers 106 may be used.

A microphone 118 converts sounds to audio information. In some embodiments, the microphone 118 is built into the computing device. The microphone 118 may also be integrated with the headset or may comprise a stand alone wired or wireless microphone. There may be more than one microphone 118 within the communications environment.

While the first communications device 112 is engaged in a call, proximity with a second communication device may be detected. Examples of a second communication device include a desktop computer 102, a laptop, a computer, a television 110, or a wireless telephone handset 116, to name just a few possibilities. The logic to detect proximity between two communication devices may reside within the first device 112, within the second device 102, 110, or 116, within the network 114, and/or within combinations of these and/or other devices. When used herein, logic may include circuitry and/or instructions stored within a memory which effects the indicated actions.

Detecting a second device 102, 110 or 116 may include detecting a wireless signal communicated by the second device 102, 110, or 116. Detecting a wireless signal communicated by the second device 102, 110, or 116 may include detecting an infrared signal, and/or applying Bluetooth communications between the first 112 and second 102, 110, or 116 devices.

Detecting a second communication device 102, 110, or 116 in proximity to a first communication device 112 engaged in a call may include identifying the second device 102, 110, or 116 visually, e.g. from one or more images captured by the first 112 or second devices 102, 110, 116.

Detecting a second communication device 102, 110, or 116 in proximity to a first communication device 112 engaged in a call may include detecting that the first device 112 is in a physical area, and detecting that the second device 102, 110, or 116 is also in the area.

Detecting a second communication device 102, 110, or 116 in proximity to a first communication device 112 engaged in a call may include applying wireless communication between a third communication device and the second communication device 102, 110 or 116. The third device and the second device 102, 110 or 116 may communicate using Bluetooth technology. The third device may be carried by a user of the first communications device 112. For example, the third device may be a Bluetooth-capable medallion worn by the user of the first communications device 112.

When a second communications device 102, 110, or 116 is detected to be in proximity to the first communications device 112 which is engaged in a call, the call may be transferred in a substantially uninterrupted manner from the first device 112 to the second device 102, 110, or 116. Providing substantially uninterrupted transfer of the call to the second device 102, 110, or 116 may include identifying the second device 102, 110, or 116 to a network 114 by which the call is provided. The network 114 may substantially duplicate the call to the second device 102, 110, or 116. The logic to accomplish the transfer of the call may reside within the network 114 or within some combination of the network and other devices, such as, for example, the first device 112.

In some embodiments, after proximity is detected between the first device 112 and the second device 102, 110, or 116, transfer may occur automatically. Transfer may also occur after user manipulation of a control on the first device 112. Controls of the first device 112 may include at least one button, lever, dial, touch-sensitive area, switch, or voice command control. For example, the user may be provided with an option on the device's 112 display which, if selected, may initiate call transfer.

Alternatively, transfer may occur after user manipulation of a control on the second device 102, 110, or 116. For example, if the second device is a computer 102, its display may show an option which, if selected, may initiate call transfer. In some embodiments, the call may be transferred in response to motion of the first device toward the second device. In some embodiments, the call may be transferred in response to orienting the first device toward the second device.

In some embodiments, after the call has been transferred to the second device 102, 110, or 116, it may be transferred in a substantially uninterrupted manner back to the first device 112. The transfer back to the first device 112 may in some embodiments occur automatically. As an example, automatic transfer back to the first device 112 may occur when the first device 112 is moved out of proximity with the second device 102, 110, or 116. The transfer back to the first device 112 may also occur as a result of user manipulation of a control on the first device 112 or on the second device 102, 110, or 116.

Transferring the call from the first device 112 to the second device 102, 110, or 116 may include terminating the call from the perspective of the first device 112. In some embodiments, transferring the call includes terminating the call to the first device 112 from the perspective of the network 114. If a second call is received, the second call may automatically or under user control also be transferred to the second device 102, 110, or 116.

In some embodiments, communications to the first 112 and second 102, 110, or 116 devices may be routed through a central premise device, such as the base station 106.

In some embodiments, communications to the second device 102, 110, or 116 may be routed through the first device 112.

In some embodiments where a central premise device 106 or the first device 112 provides the interface to the second device 102, 110, or 116, the network 114 and its logic may not be involved in accomplishing the call transfer. In that situation, the call, from the standpoint of the network 114, may still be ongoing with the first device 112.

In some embodiments, although the call has been transferred to the second device 102, 110, or 116, the user may be able to perform some control functions with respect to the call by manipulating controls on the first device 112. For example, the user may be able to terminate the call by manipulating a control on the first device 112.

In some embodiments, the user will additionally or alternatively be able to perform some control functions with respect to the call by manipulating controls on the second device 102, 110, or 116.

Figure 2:
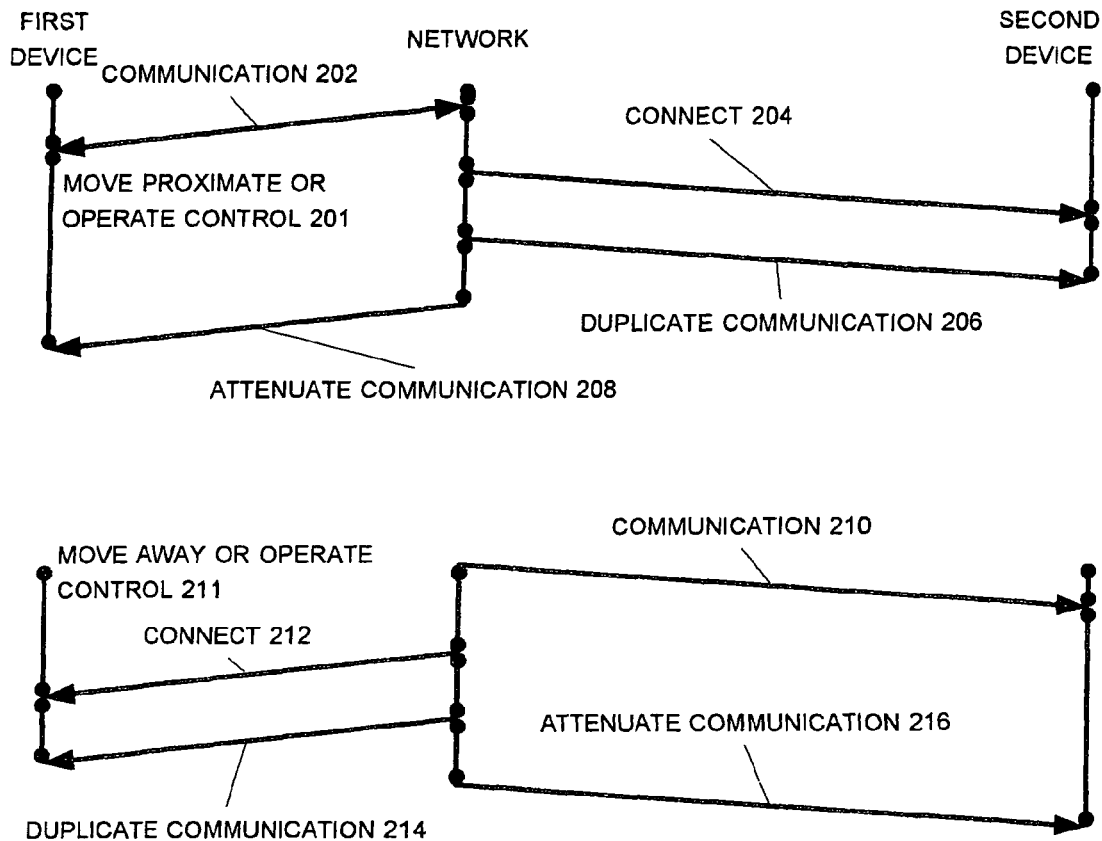
FIG. 2 is an action flow diagram of an embodiment of a communication transfer process.

FIG. 2 is an action flow diagram of an embodiment of a communication transfer process initiated by action of the first device. At 202, communication takes place between the first device and the network. At 201, transfer of the call which is active on the first device is initiated (e.g., transfer to occur to the second device). Transfer may be initiated automatically when the first device becomes proximate with the second device. Alternatively and/or in conjunction with proximity, the user may operate a control on the first device and/or second device to initiate transfer.

In some embodiments, the user may operate a control in response to either/both the first or second device providing an indication that a call transfer is available. The device in most embodiments would provide this indication after proximity has been detected. Examples of the first device providing an indication that a call transfer is available, include the first device providing at least one touch screen selection, activating a light emitting diode or other visual indication, and/or providing a tone or other audible indication. An example of the second device providing an indication would be providing, on its display, a message indicating proximity exists along with an option to initiate transfer.

At 204, the network provides a call connection to the second device. At 206, the network duplicates the communication to the second device. The duplication of communication which may occur accomplishes, from the user's perspective, a substantially uninterrupted call as transfer is accomplished. This may be advantageous as the user's attention need not move instantaneously from the first to second device.

At 208, the network attenuates communication to the first device, (while possibly enhancing communication to the second device). Gradually attenuating communication with the first device may include gradually reducing a volume of the communication with the first device. Gradually enhancing communication with the second device may include gradually increasing the volume of communication with the second device.

In a second scenario, at 210 the communication takes place between the network and the second device. At 211, transfer of the call which is active on the second device is initiated (transfer to occur to the first device). Transfer may be initiated automatically when the second device is no longer proximate with the first device (and thus presumably, the first device and its user have moved away from the second device). Alternatively, the user may operate a control on the first or second device to initiate transfer.

At 212, the network provides a call connection to the first device. At 214, the network duplicates the communication to the first device. At 216, communication to the second device is attenuated (while possibly enhancing communication to the first device).

The network may be actively involved in accomplishing the call transfer in the above scenarios. Alternatively, in some embodiments, the network may be unaware that a call transfer is occurring. In those embodiments, all and/or part of logic to accomplish the call transfer, including duplicating and enhancing or attenuating communications as indicated, may be performed by elements other than the network. For example, the first device might act as a pass-through for communications with the second device.

Figure 3:
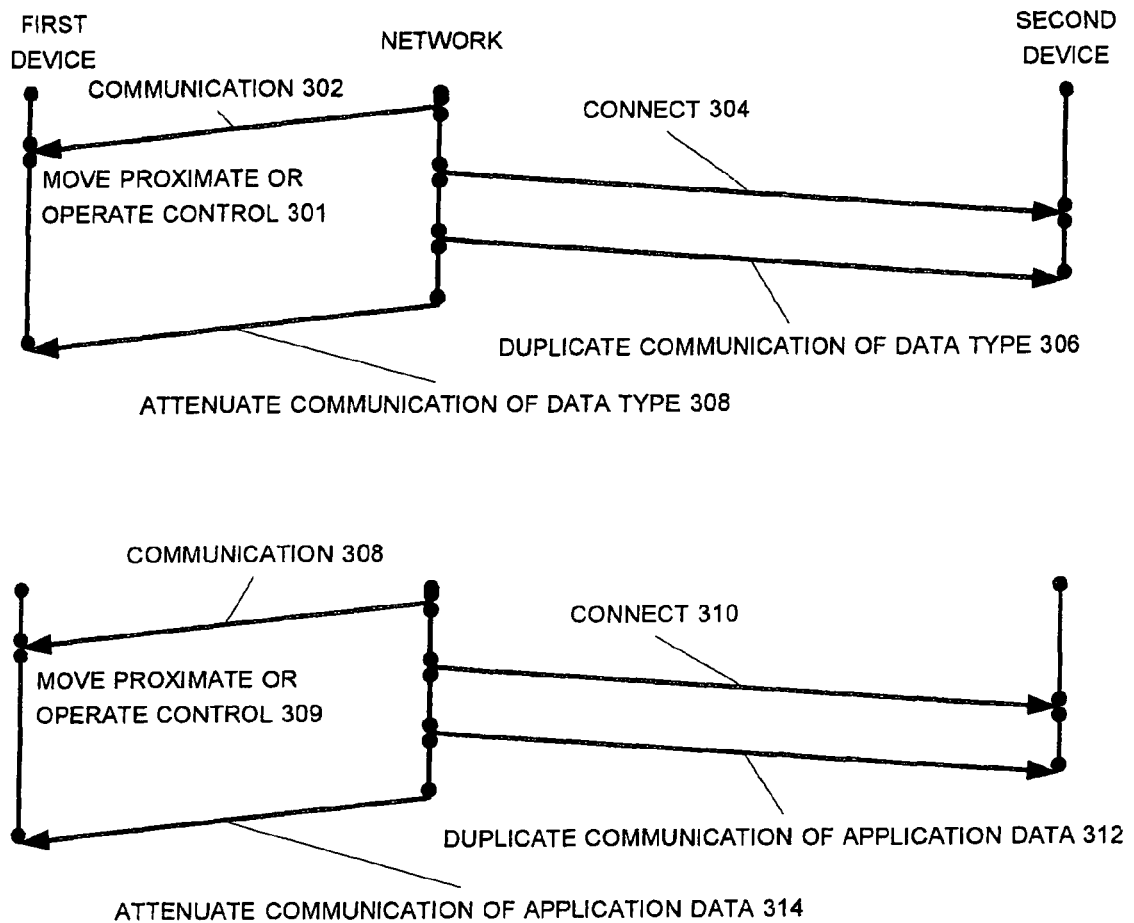
FIG. 3 is an action flow diagram of an embodiment of a partial communication transfer process.

FIG. 3 is an action-flow diagram of an embodiment of the partial communication transfer process. At 302, communication takes place between the first device and the network. At 301, the first device moves proximate to the second device, and/or the user of the first device operates a control of the first and/or second devices.

At 304, the network provides a call connection to the second device.

At 306, one or more particular data types occurring within the call to the first device are duplicated to the second device. This duplication may be performed wholly or in part by logic within the network, as is shown in FIG. 3.

Alternatively, in other embodiments, the network may not participate in duplication of a portion of the call to the first device. For example, the first device may act as a conduit for specific call information to the second device, without intervention of the network.

Thus, as shown in FIG. 3, a portion of the call state (for one or more data types) is duplicated. For example, if the second device has speakers, sounds which are sent to the first device may be expressed through the speakers of the second device. For this same call, other types of communication, such as inbound text messages, may still occur through the first device.

As a second example, if the second device were a television, sounds and images destined for the first device might be duplicated or expressed on the television. For this same call, images which include text might additionally be expressed on the first device, where data entry would occur.

To accomplish partial call transfer for a particular data type or types, the effecting computing elements (e.g. processor(s) and logic of the first device, and/or second device, and/or network) may detect the data type of communication data. Examples of a data type of communication include voice, video, data file, or music.

Additionally, the capabilities of the proximate device for rendering the data type may be recognized. Examples include facilities for displaying images, playing video, and/or playing sound or music.

Accomplishing a partial call transfer may include maintaining communication with the first device of data not having the selected data type(s), and transferring data having the selected data type(s) to the proximate device.

At 308, the network attenuates communication of the data type (for example, sounds) to the first device. In other embodiments, as previously indicated, attenuation may be performed by the first (or second) devices without involvement by the network.

In another scenario, at 308 communication occurs to the first device. At 309, proximity and/or user manipulation of a control on the first and/or second device results in initiation of a partial call transfer. At 310, a connection occurs to the second device as a result of this initiation. At 312, the network and/or other computing elements duplicates communication of particular application data to the second device (e.g. duplicates data to the second device for which there is a well-suited application of the second device). For example, if the second device were a computer having a media player application, and the first a cellular phone, it might be recognized that electronic video messages are well suited to be handled on the second device.

To accomplish partial call transfer for data associated with a particular application, applications associated with particular communication data may be recognized. Examples of likely applications include a chat application, a messaging application, a game application, a video application, an image processing application, a music application, or an audio application.

Additionally, some of the capabilities of a proximate device may be recognized, possibly including identification of the capability to provide certain applications.

Additionally, device states and data may be maintained and communicated to accomplish a substantially uninterrupted transfer to the proximate device of data associated with the application. For example, file attachments associated with an email message may be transferred along with ongoing communications.

At 314, the network attenuates communication of the application data to the first device and possibly enhances communication of the application data to the second device.

As mentioned before, in other embodiments this functionality may be accomplished without the involvement of network logic, e.g. the first device acts as a conduit of the data type(s) to the second device.

Figure 4:
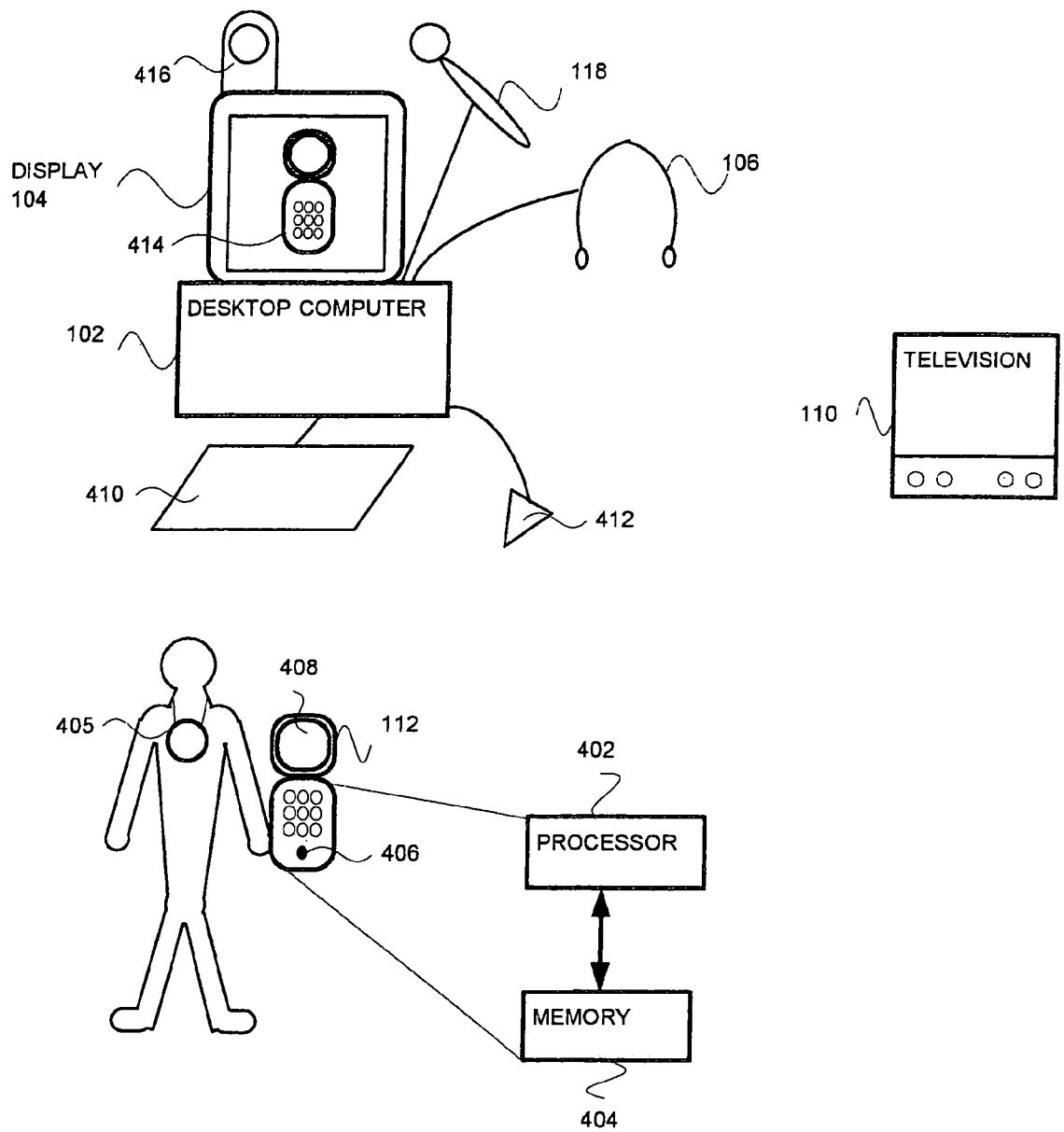
FIG. 4 is a block diagram of an embodiment of a communication environment.

FIG. 4 is a block diagram of an embodiment of a communication environment.

Within the communications environment, a first device 112 comprises a display 408, an audio input 406, a processor 402, and memory 404.

Another device 102 comprises a keyboard 410, a camera 416, and pointing device 412 (e.g. mouse) inputs. The device 102 also comprises a microphone 118, a display 104, and earphones 106.

In some embodiments, the user of the first device 112 may wear a device 405, which may be used, at least in part, to detect proximity between the first device 112 and the second device 102. Examples of a device 405 which may be worn comprise a BlueTooth medallion, a watch, or a device incorporated into jewelry or clothing.

Proximity detection may comprise detecting more than one proximate device. For example, in the embodiment of FIG. 4, the mobile device 112, the television 110, and the device 102 may be detected as being in proximity to one another.

Proximity detection may comprise detecting more than one mobile device in an environment. For example, a mobile device such as 112 could be detected, and additionally, a notebook computer and portable music player could be detected.

The proximity detection function may be incorporated into the first device 112, second device 102, or both, or may take place via a separate device such as the wearable device 405.

The wearable device 405 may incorporate additional functionality in addition to proximity detection, such that functionality (logic) to facilitate various acts described herein in conjunction with the first and second devices 112 and 102, respectively. For example, a watch or medallion may incorporate cellular telephone features, data processing functionality, and proximity detection functionality. Thus, in some embodiments the device 405 could take the place of the first device 112.

Several of devices 112, 102, and 405 may incorporate a portion or all of the proximity detection function, and at least one (not necessarily the same one(s)) may accomplish this functionality at various times. The device(s) used for proximity detection may also be used to detect loss of proximity.

When one device detects proximity with another device, the presence of an active call on one of the devices may also be ascertained as part of or along with proximity detection. For example, call transfer to a second device 102 from a first device 112 may begin with detection of proximity between the devices and ascertaining that the first device 102 has an active call.

Providing a substantially uninterrupted transfer of a call may comprise substantially duplicating at least a portion of the state of the transferred call onto the target device. For example, if the call is on hold on the first device, the call may also be placed on hold on the second device once transferred.

Various events may trigger the call transfer process. For example, call transfer may be provided, at least in part, in response to motion of the first device 112 toward the second device 102. Call transfer may be provided, at least in part, in response to orienting the first device 112 toward the second device 102. Call transfer may be provided, at least in part, if the second device 102 has capabilities superior to the first device 112 to render information of the call. Call transfer may be provided, at least in part, upon detection of indications that a user of the first device 112 has shifted to using the second device 102. Such indications that a user of the first device 112 has shifted to using the second device 102 include detecting that the second device 102 (when mobile) is moving away from the first device 112, or vice-versa.

Activity of the second device 102 might also indicate that usage has shifted. Such activity may include I/O activity on the second device 102. Detecting I-O activity on a communications device 102 may include detecting I-O activity other than actions to explicitly cause a transfer of the call. Such I/O activity may include such things as adjustment of a visual display control, adjustment of an audio input or output control, adjustment of a video input or output control, a keyboard event, or use of a mouse or other pointing device.

In some embodiments, the first device 112 may continue to monitor aspects of the call after the call is transferred to the second device 102 (or multiple devices). This monitoring may include the first device 112 recording call information after the call has been transferred.

Providing a substantially uninterrupted transfer of a call may include transferring selected parties of the call to the second device. Selected parties to the call may include parties selected by a user, selected channels of the call, and/or parties selected according to rules comprised by at least one of the first and second devices. Selected parties to the call may include parties and/or channels of the call selected according to applications of and/or capabilities of the second device. For example, selected parties to the call may include parties that are instant messaging chat participants, because the second device is better suited (e.g. larger keyboard, larger screen) to supporting an instant messaging application. Selected parties to the call may include parties that are participants in a voice conference call, for example, because the second device is better suited (e.g. superior microphone and speaker) to supporting a voice conferencing application. Selected parties to the call may include parties that are participants in a video conference call, for example, because the second device is better suited to supporting a video conferencing application.

An active call may be transferred, at least in part, to a second device 102 already having an existing (different) active call. At least a portion of the call on the first device 112 may be merged with the existing call on the second device 102. Merging may include merging voice data of the call to the first device 112 with non-voice, non-video data of the existing call of the second device 102. Merging may include merging voice data of the call to the first device 112 with video data of the existing call. Merging may include merging the call of the first device 112 and the existing call into a voice and/or video conference call.

The information communicated via the call on the first device 112 may be adjusted when transferred according to at least one of I/O, processing, data processing application, or communication capabilities of the second device 102. Adjusting the information communicated via the call may include adjusting the bandwidth of the call, increasing the resolution of video information of the call, and/or increasing the fidelity and/or number of channels of audio information of the call. Adjusting the information of the call may include adding video information to the call, adding non-audio, non-video data to the call.

The manner in which the information of the call is presented to a user may also be adjusted according to at least one of I/O, processing, data processing application, or communication capabilities of the second device 102. Adjusting the presentation of information of the call may include adjusting video and/or image presentation dimensions to fit a display of the second device 102, adjusting audio fidelity and/or number of channels according to the audio rendering capabilities of the second device 102, and/or activating at least one data processing application of the second device 102 to process information of the call.

The second device 102 may be enabled to control at least some aspects of the call (or portion or portions thereof transferred from the first device 112. Enabling the second device 102 to control at least some aspects of the call of the first device 112 may include providing an emulation of controls of the first device on the second device. Emulation 414 of at least some control aspects of the first device 112 may be presented on a display 104 of the second device 102. Emulation may comprise providing via the second device 102 at least a portion of a user interface of the first device 112. Emulating a portion of a user interface may include emulating buttons or other controls of the first device 112 on a graphical user interface (GUI) of the second device 102, e.g. providing a picture, image, or other reproduction of at least part of the first device 112 on a GUI of the second device 102.

Enabling the second device 102 to control at least some aspects of the call of the first device 112 may include enabling control of the call of the first device 112 via voice commands to the second device 102, enabling control of the call to the first device 112 via gestures to the second device 102, controlling connection and/or disconnection of the call of the first device 112, enabling control of the status of the call of the first device 112, and/or enabling control of data recording features of the call of the first device 112.

In response to transfer of the call to the second device 102 or devices, one or more parts of the first device 112 may be placed into a sleep mode. Placing at least a part of the first device 112 into a sleep mode may include decreasing power consumption of at least a part of the first device 112, for example, by dimming or disabling a visual display of the device 112, reducing the clock rate of and/or disabling a processor and/or a processor bus of the device 112, reducing the clock rate of and/or disabling a memory bus and/or communication bus of the device 112, reducing power consumption of an audio system component of the device 112, reducing power consumption of a memory controller and/or memory interface of the device 112, and/or reducing the power consumption of a communication controller and/or communication interface of the device 112.

Power consumption of at least a part of the first device 112 may be further reduced if the call is discontinued or if the second device 102 loses proximity with the first device 112.

In some embodiments, a substantially uninterrupted transfer of at least a portion of the call may occur to the second device 102 and transfer of at least a portion of the call may occur to a third device 110. Providing a transfer of the call to multiple target devices may include selecting which device to transfer a portion or portions of the call to according to the target device capabilities, user selections of the devices, a type of information in the portion or portions of the call (e.g. is it audio or video), selecting one or more of the target devices according to the data processing application or applications available on the target device(s) (e.g. does the target device support instant messaging, chat, spreadsheets, word processing, and so on), and/or according to rules comprised by at least one of the first 112, second 102, and third 110 devices (or more).

In some embodiments, a call may be transferred back to the first device 112 from one or more of the devices 102, 110 to which the call was first transferred. The call may be transferred back to the first device 112 in response to the first device 112 moving away from the second device 102 and/or additional devices 110. The call may be transferred back as a result of indications that the user has shifted back to using the original communicating device 112. I/O activity of the first device 112 and/or other devices may be monitored to determine if transfer back to the first device 112 should occur. Some or all of the call transfer features described herein for the original transfer of the call may be provided for the transfer of the call back to the first device 112. For example, selected parties of the call may be transferred back to the first device 112, the second 102 or multiple devices may continue to monitor the status/duration of the call after transfer back, the transfer back may occur for a particular data type of the call and/or according to capabilities/applications of the first device 112, and so on.

Figure 5:
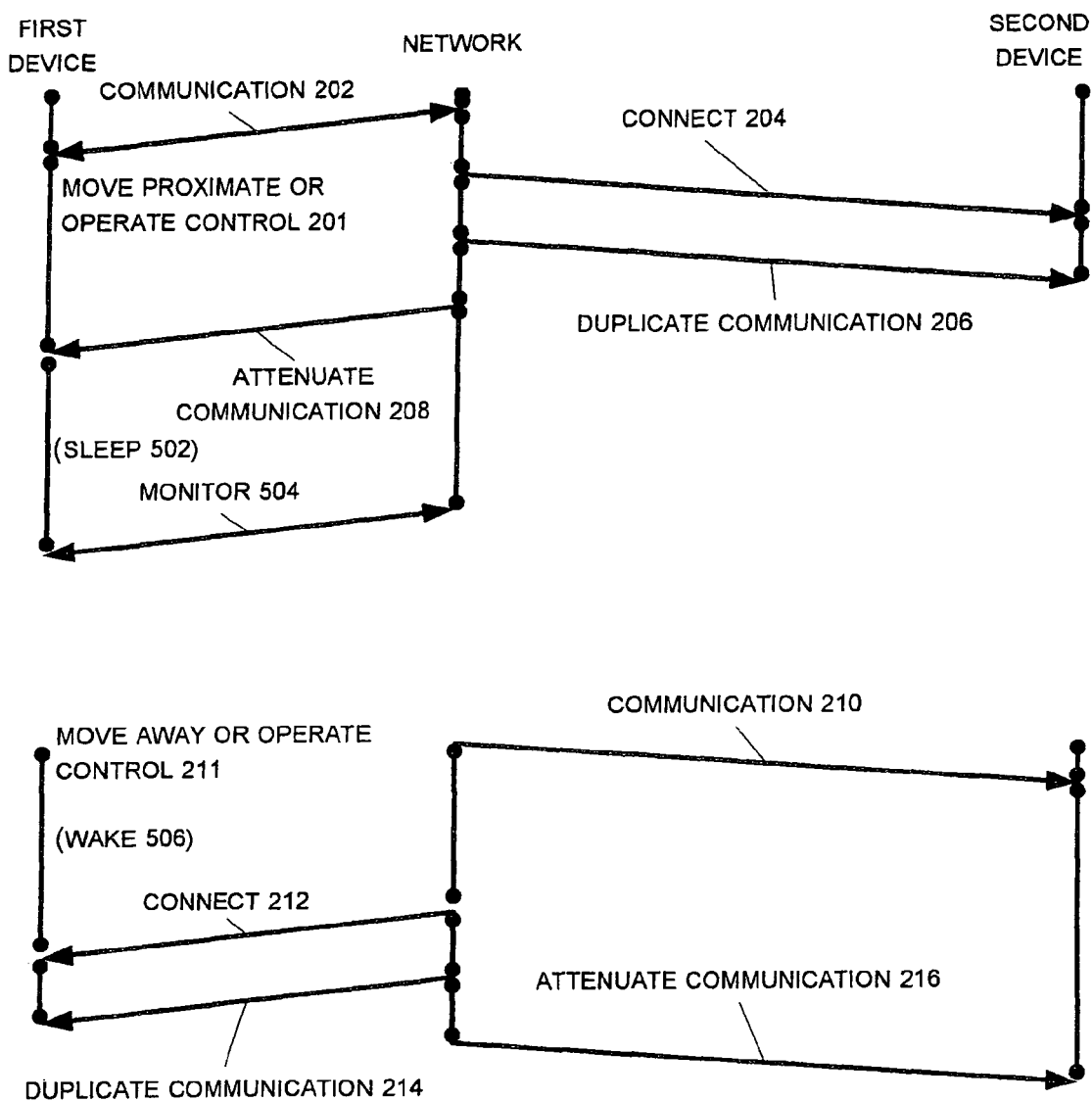
FIG. 5 is an action flow diagram of an embodiment of a communication transfer process.

FIG. 5 is an action flow diagram of an embodiment of a communication transfer process. Upon transfer of the call to the second device, the all or portions of the first device may sleep at 503, e.g. enter a reduced power state. The first device may at 504 continue to monitor as least some aspects of the call transferred to the second device. The first device may wake at 506 upon detecting that the user's attention has returned to the first device.

Figure 6:
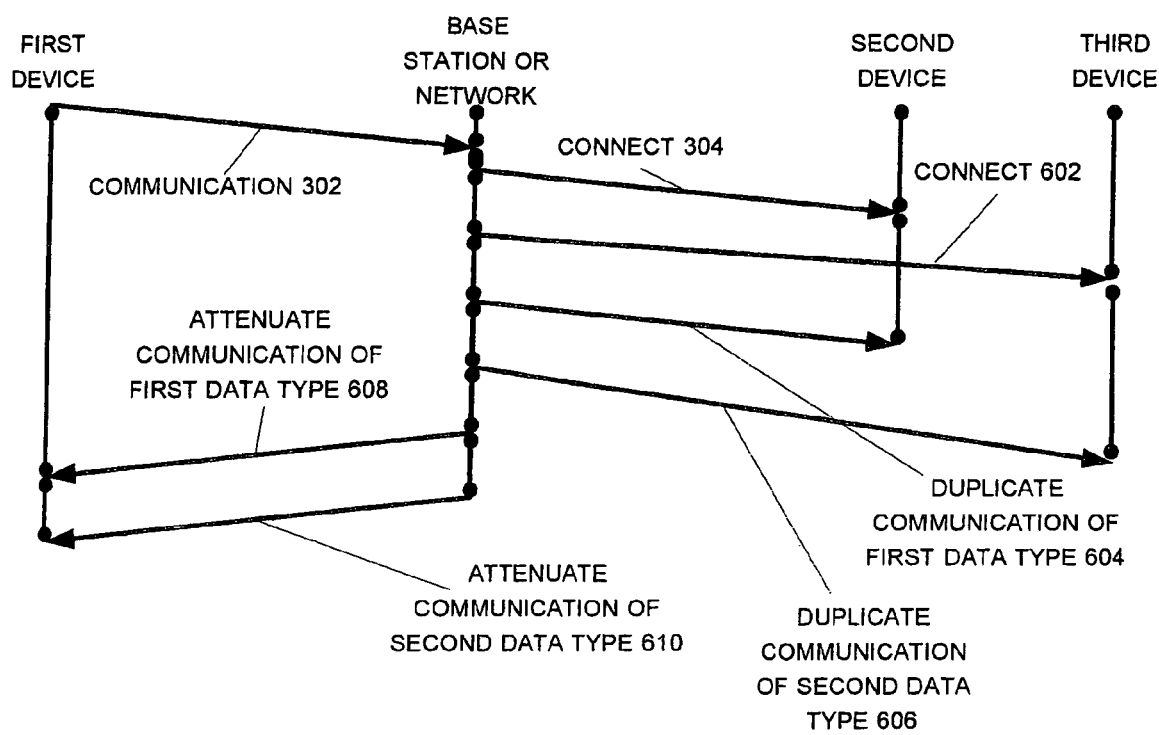
FIG. 6 is an action flow diagram of an embodiment of a partial communication transfer process.

FIG. 6 is an action flow diagram of an embodiment of a partial communication transfer process. At 302, a first device communicates with a base station or network. One or more of the data types within the communication are identified. Examples of data type of communication data include voice, video, data file, or music. At 304, a connection is established to a second device. A portion of the communication to the first device, having a first data type, is transferred to the second device at 604. The second device has been identified as a proximate device capable of rendering the first data type. Examples of rendering the data type include at least one of displaying images, playing video or playing sound or music.

Selecting a proximate device to render or process communications data may include identifying an application, provided by that device, which can process the data. Examples of identifying an application associated with communication data include at least one of a chat application, messaging application, game application, video application, image processing application, music application, or audio application.

At 602 communication is established to a third device. A portion of the communication to the first device, having a second data type, is transferred to the third device at 606. The third device has been identified as a proximate device capable of rendering the second data type. At 608, communication to the first device is attenuated for the first data type. At 610, communication to the first device is attenuated for the second data type.

Providing a substantially uninterrupted transfer of the communications data in a call may mean maintaining communications with the first device for those data types and applications not supported by the proximate devices, and transferring to a second or additional devices communications for particular data type associated with particular applications/capabilities which are supported by the proximate devices.

Those having skill in the art will appreciate that there are various vehicles by which processes and/or systems described herein can be effected (e.g., hardware, software, and/or firmware, collectively, logic), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein, may be implemented via forms of logic including Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented using forms of logic including integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMS, digital tape, and computer memory; and transmission type media such as digital and analog communication links using TDM or IP based communication links (e.g., packet links).

In a general sense, those skilled in the art will recognize that the various aspects described-herein which can be implemented, individually and/or collectively, by logic including a wide range of hardware, software, firmware, or any combination thereof which can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Unless the context clearly requires otherwise, throughout the description and the claims, the words "comprise," "comprising," and the like, are to be construed in an inclusive sense as opposed to an exclusive or exhaustive sense. Or in other words, for the purposes of "including, but not limited to." Words using the singular or plural number also include the plural or singular number respectively. Additionally, the words "herein," "above," "below" and words of similar import, when used in this application, shall refer to this application as a whole and not to any particular portions of this application separately. When the claims use the word "or" in reference to a list of two or more items, that word covers all of the following interpretations of the word: any of the items in the list, all of the items in the list and any combination of the items in the list.

What is claimed is:

1. A method comprising:
    detecting a second communication device in proximity to a first communication device engaged in a call;
    providing substantially uninterrupted transfer of the call to the second communication device; and
    placing at least a part of the first communication device into a sleep mode in response to transfer of the call to the second communication device, wherein the detecting a second communication device in proximity to a first communication device engaged in a call further includes:
        identifying the second communication device from one or more images.

2. The method of claim 1, wherein providing substantially uninterrupted transfer of the call to the second communication device further includes:
    substantially duplicating information of the call to the second communication device while the call is ongoing with the first communication device.

3. The method of claim 1, wherein providing substantially uninterrupted transfer of the call to the second communication device further includes:
    transferring the call automatically as a result of obtaining proximity with the second communication device.

4. The method of claim 1, wherein providing substantially uninterrupted transfer of the call to the second communication device further includes:
    providing transfer of the call in response to motion of the first communication device toward the second communication device.

5. The method of claim 1, wherein providing substantially uninterrupted transfer of the call to the second communication device further includes:
    providing transfer of the call in response to orienting the first communication device toward the second communication device.

6. The method of claim 1, wherein detecting a second communication device in proximity to a first communication device engaged in a call further includes:
    detecting that the first communication device is in a physical area; and
    detecting that the second communication device is also in the area.

7. The method of claim 1, wherein detecting a second communication device in proximity to a first communication device engaged in a call further includes:
    applying wireless communication between a third communication device and the second communication device.

8. The method of claim 1, wherein the first communication device further includes:
    a Bluetooth medallion.

9. The method of claim 1, further including:
    providing substantially uninterrupted transfer of the call back to the first communication device.

10. The method of claim 9, wherein providing substantially uninterrupted transfer of the call back to the first communication device further includes:
    providing transfer of the call back to the first communication device in response to the first communication device moving away from the second communication device.

11. The method of claim 1, further including:
    the first communication device receiving a second call; and
    transferring the second call to the second communication device.

12. The method of claim 1, further including:
    substantially duplicating at least a portion of the state of the call on the second communication device.

13. The method of claim 1, further including:
    routing communications to the first and second communication devices through a central premise device.

14. The method of claim 1, further including:
    routing communications to the second communication device through the first communication device.

15. The method of claim 1, further including:
    the first communication device providing an indication that call transfer is available as a result of detecting proximity of the second communication device and the first communication device.

16. The method of claim 1, further including:
    the first communication device continuing to monitor aspects of the call after the call is transferred to the second communication device.

17. The method of claim 16, wherein first communication device continuing to monitor aspects of the call after the call is transferred to the second communication device further includes:
    the first communication device recording call information after the call has been transferred.

18. The method of claim 1, further including:
    further reducing power consumption of at least a part of the first communication device if the call is discontinued or the second communication device becomes no longer proximate to the first communication device.

19. A system comprising:
    a first communication device;
    a second communication device;
    logic to detect if the second communication device is in proximity to the first communication device;
    logic to provide a substantially uninterrupted transfer of a call of the first device to the second communication device;
    logic to place at least a part of the first communication device into a sleep mode in response to transfer of the call to the second communication device; and
    logic to further reduce power consumption of at least a part of the first communication device if the call is discontinued or the second communication device becomes no longer proximate to the first communication device.

20. The system of claim 19, wherein logic to provide a substantially uninterrupted transfer of a call of the first device to the second communication device further includes:
    logic to substantially duplicate information of the call to the second communication device while the call is ongoing with the first communication device.

21. The system of claim 19, wherein logic to provide a substantially uninterrupted transfer of a call of the first device to the second communication device further includes:
    logic to establish a call connection to the second communication device; and
    logic to substantially duplicate call information to the second communication device.

22. The system of claim 19, wherein logic to provide a substantially uninterrupted transfer of a call of the first device to the second communication device further includes:
    logic to transfer the call in response to operation of a control of the second communication device.

23. The system of claim 19, wherein the first communication device further includes:
    a Bluetooth medallion.

24. The system of claim 19, further includes:
logic to provide substantially uninterrupted transfer of the call back to the first communication device.

25. The system of claim 24, wherein logic to provide substantially uninterrupted transfer of the call back to the first communication device further includes:
logic to provide transfer of the call back to the first communication device in response to the first communication device moving away from the second communication device.

26. The system of claim 24, wherein logic to provide substantially uninterrupted transfer of the call back to the first communication device further includes:
logic to provide transfer of the call back to the first communication device in response to operating a control of the first communication device.

27. The system of claim 19, further including:
the first communication device receiving a second call; and
logic to transfer the second call to the second communication device.

28. The system of claim 19, further including:
first communication device logic to provide an indication that call transfer is available as a result of the logic to detect proximity of the second communication device and the first communication device.

29. The system of claim 28, wherein first communication device logic to provide an indication that call transfer is available further includes:
first communication device logic to provide an indication that call transfer to the second communication device is available.

30. The system of claim 28, wherein first communication device logic to provide an indication that call transfer is available further includes:
first communication device logic to provide at least one of a touch screen selection, activate a light emitting diode or other visual indication, or logic to provide a tone or other audible indication.

31. The system of claim 19, further including:
first communication device logic to continue to monitor aspects of the call after the call is transferred to the second communication device.

32. The system of claim 31, wherein first communication device logic to continue to monitor aspects of the call after the call is transferred to the second communication device further includes:
first communication device logic to record call information after the call has been transferred.

33. A method comprising:
detecting a second communication device in proximity to a first communication device engaged in a call;
providing substantially uninterrupted transfer of the call to the second communication device; and
placing at least a part of the first communication device into a sleep mode in response to transfer of the call to the second communication device, wherein the placing at least a part of the first communication device into a sleep mode further includes:
gradually decreasing power consumption of at least a part of the first communication device.

34. A system comprising:
a first communication device;
a second communication device;
logic to detect if the second communication device is in proximity to the first communication device, wherein the logic to detect if the second communication device is in proximity to the first communication device further includes:
logic to identify the second communication device from one or more images;
logic to provide a substantially uninterrupted transfer of a call of the first device to the second communication device; and
logic to place at least a part of the first communication device into a sleep mode in response to transfer of the call to the second communication device.

35. A system comprising:
a first communication device;
a second communication device;
logic to detect if the second communication device is in proximity to the first communication device;
logic to provide a substantially uninterrupted transfer of a call of the first device to the second communication device, wherein the logic to provide the substantially uninterrupted transfer of the call of the first device to the second communication device further includes:
logic to gradually attenuate communication with the first communication device; and
logic to place at least a part of the first communication device into a sleep mode in response to transfer of the call to the second communication device.

36. A system comprising:
a first communication device;
a second communication device;
logic to detect if the second communication device is in proximity to the first communication device;
logic to provide a substantially uninterrupted transfer of a call of the first device to the second communication device, wherein the logic to provide the substantially uninterrupted transfer of the call of the first device to the second communication device further includes:
logic to gradually enhance communication with the second communication device; and
logic to place at least a part of the first communication device into a sleep mode in response to transfer of the call to the second communication device.

37. A system comprising:
a first communication device;
a second communication device;
logic to detect if the second communication device is in proximity to the first communication device;
logic to provide a substantially uninterrupted transfer of a call of the first device to the second communication device, wherein the logic to provide the substantially uninterrupted transfer of the call of the first device to the second communication device further includes:
logic to gradually enhance communication with the second communication device, wherein the logic to gradually enhance communication with the second communication device further includes:
logic to gradually increase a volume of communication with the second communication device; and
logic to place at least a part of the first communication device into a sleep mode in response to transfer of the call to the second communication device.

* * * * *